United States Patent
Covic et al.

(10) Patent No.: US 9,954,361 B2
(45) Date of Patent: Apr. 24, 2018

(54) LOCAL DEMAND SIDE POWER MANAGEMENT FOR ELECTRIC UTILITY NETWORKS

(75) Inventors: Grant Anthony Covic, Auckland (NZ); John Talbot Boys, North Shore (NZ)

(73) Assignee: Auckland UniServices Limited, Auckland (NZ)

( * ) Notice: Subject to any disclaimer, the term of this patent is extended or adjusted under 35 U.S.C. 154(b) by 985 days.

(21) Appl. No.: 14/110,428

(22) PCT Filed: Apr. 10, 2012

(86) PCT No.: PCT/NZ2012/000050
§ 371 (c)(1),
(2), (4) Date: Dec. 3, 2013

(87) PCT Pub. No.: WO2012/138235
PCT Pub. Date: Oct. 11, 2012

(65) Prior Publication Data
US 2014/0084682 A1 Mar. 27, 2014

(30) Foreign Application Priority Data

Apr. 8, 2011 (NZ) ........................................ 592161
Jul. 12, 2011 (NZ) ........................................ 594018

(51) Int. Cl.
*H02J 3/00* (2006.01)
*H02J 7/02* (2016.01)
(Continued)

(52) U.S. Cl.
CPC .................. *H02J 3/00* (2013.01); *H02J 3/14* (2013.01); *H02J 3/386* (2013.01); *H02J 7/0013* (2013.01);
(Continued)

(58) Field of Classification Search
CPC ........ H02J 3/00; H02J 13/0006; H02J 7/0013; H02J 3/386; H02J 3/14; H02J 2003/388;
(Continued)

(56) References Cited

U.S. PATENT DOCUMENTS 4,694,192 A * 9/1987 Payne ...................... H02J 3/14
307/34
5,834,855 A * 11/1998 Chiba ................... H02J 13/002
307/31
(Continued)

OTHER PUBLICATIONS

PCT International Search Report in PCT Application No. PCT/NZ2012/000050.

*Primary Examiner* — Carlos Amaya
*Assistant Examiner* — Michael Warmflash
(74) *Attorney, Agent, or Firm* — Farjami & Farjami LLP

(57) ABSTRACT

A demand side electric power supply management system is disclosed. The system comprises an islanded power system having a point of coupling to a supply grid. The islanded power system supplies a plurality of electric loads, each of which is associated with a load controller to control the maximum power demanded by that load. A measuring means associated with the point of coupling measures the total power transfer between the grid and the islanded system, and a system controller monitors the measured power transfer relative to a set point and provides a control signal to a plurality of load controllers. Each load controller receives substantially the same control signal and determines the maximum power which each load associated with the load controller is allowed to draw from the islanded power system based on information contained in the control signal.

20 Claims, 10 Drawing Sheets

Generalised schematic of a DGDC system

Figure 12:
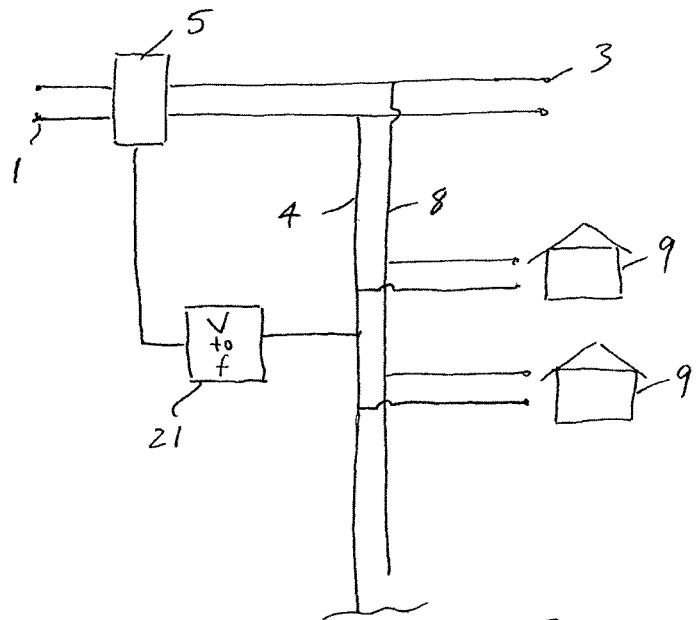

(51) Int. Cl.
  *H02J 50/10* (2016.01)
  *H02J 3/14* (2006.01)
  *H02J 3/38* (2006.01)
  *H02J 7/00* (2006.01)
  *H02J 13/00* (2006.01)
  *H02J 5/00* (2016.01)

(52) U.S. Cl.
  CPC .......... *H02J 7/025* (2013.01); *H02J 13/0006* (2013.01); *H02J 50/10* (2016.02); *H02J 5/005* (2013.01); *H02J 2003/388* (2013.01); *Y02B 10/30* (2013.01); *Y02E 10/763* (2013.01); *Y02E 60/721* (2013.01); *Y02T 10/7055* (2013.01); *Y02T 90/168* (2013.01); *Y04S 10/126* (2013.01); *Y04S 30/12* (2013.01); *Y10T 307/297* (2015.04); *Y10T 307/469* (2015.04)

(58) Field of Classification Search
  CPC .. H02J 5/005; Y10T 307/469; Y10T 307/297; Y02B 10/30; Y04S 10/126; Y04S 30/12; Y02E 60/721; Y02E 10/763; Y02T 10/7055; Y02T 90/168
  USPC ..................................................... 307/17, 39
  See application file for complete search history.

(56) References Cited

U.S. PATENT DOCUMENTS

| | | | | |
|---|---|---|---|---|
| 6,624,532 | B1* | 9/2003 | Davidow | H02J 3/14 307/31 |
| 7,180,301 | B1* | 2/2007 | Hynes | G01R 19/2513 324/102 |
| 7,184,903 | B1* | 2/2007 | Williams | H02J 3/32 702/60 |
| 8,340,833 | B2* | 12/2012 | Hershey | G01S 5/0009 323/355 |
| 8,554,385 | B2* | 10/2013 | Donolo | H02J 3/12 290/44 |
| 2004/0075343 | A1* | 4/2004 | Wareham | H02J 3/14 307/39 |
| 2011/0106321 | A1* | 5/2011 | Cherian | H02J 3/00 700/286 |
| 2015/0214738 | A1* | 7/2015 | Covic | H02J 3/32 307/31 |

* cited by examiner

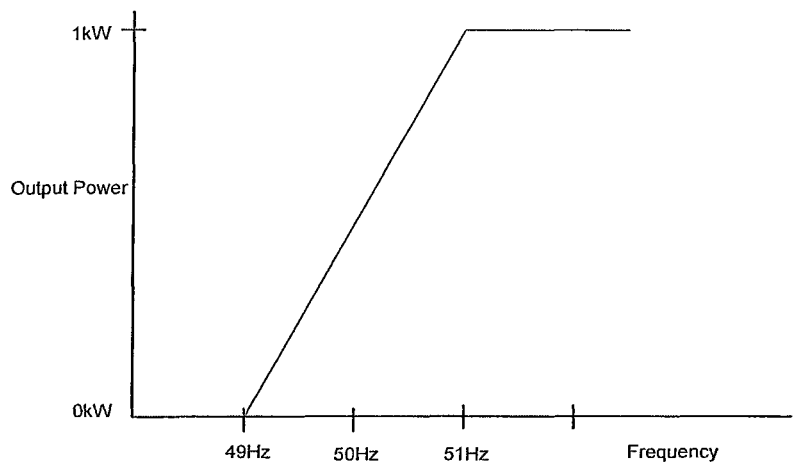
Figure 1. Power versus frequency for a 1 kW DDC Controller
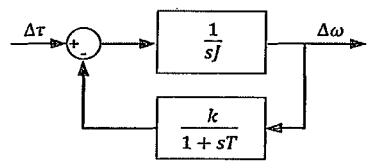
$$\frac{\Delta \omega}{\Delta \tau} = \frac{1+sT}{s^2 JT + sJ + k} \frac{W1}{W0} = 1 - \frac{1}{I_{SC}}$$
Figure 2. Block diagram, and transfer function of a DDC controller

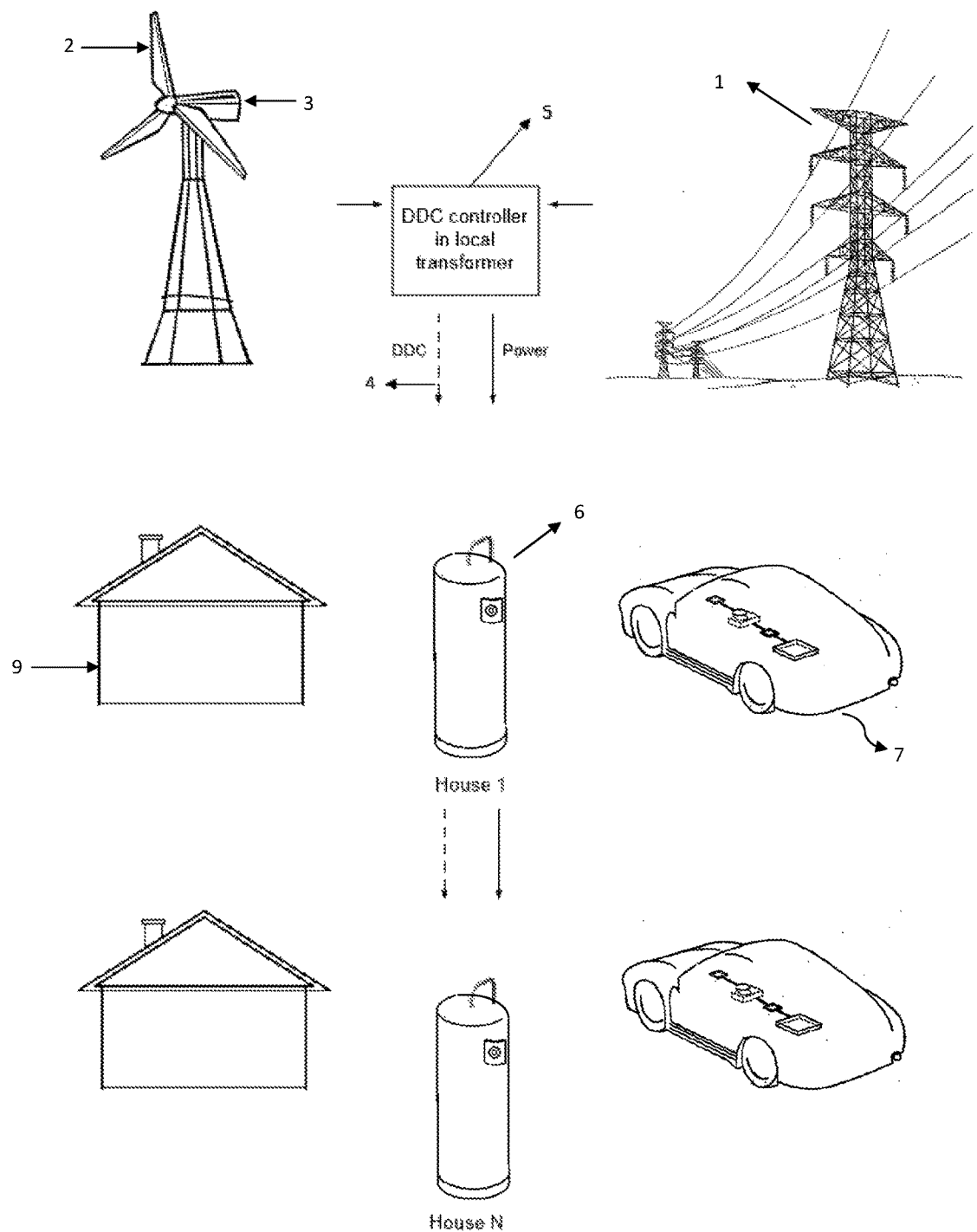
Figure 3 - Generalised schematic of a DGDC system

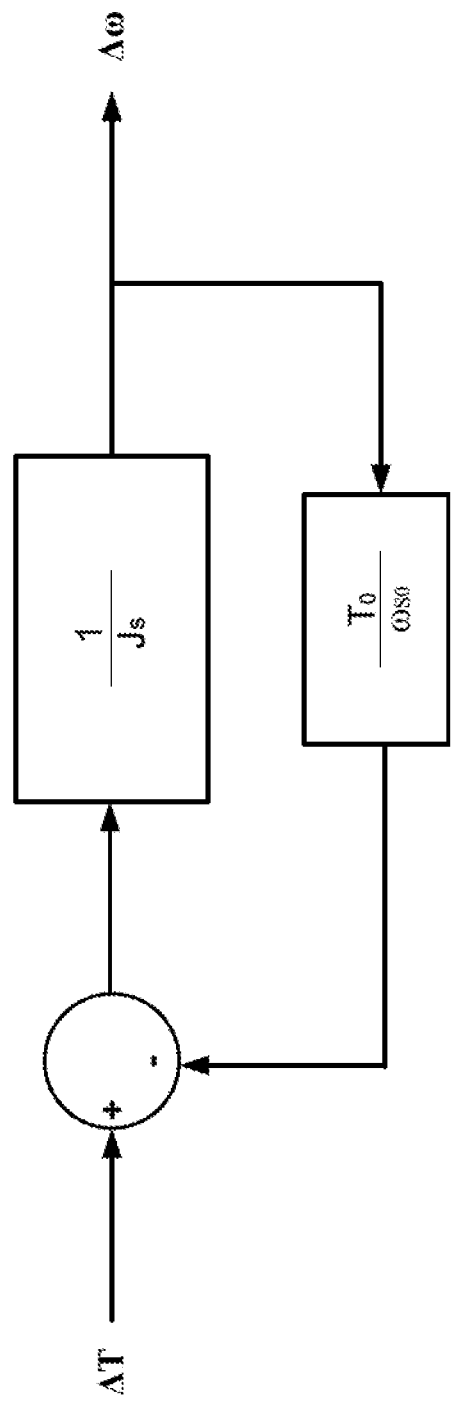
Figure 4- Block Diagram and Transfer Function for an LDC Controller

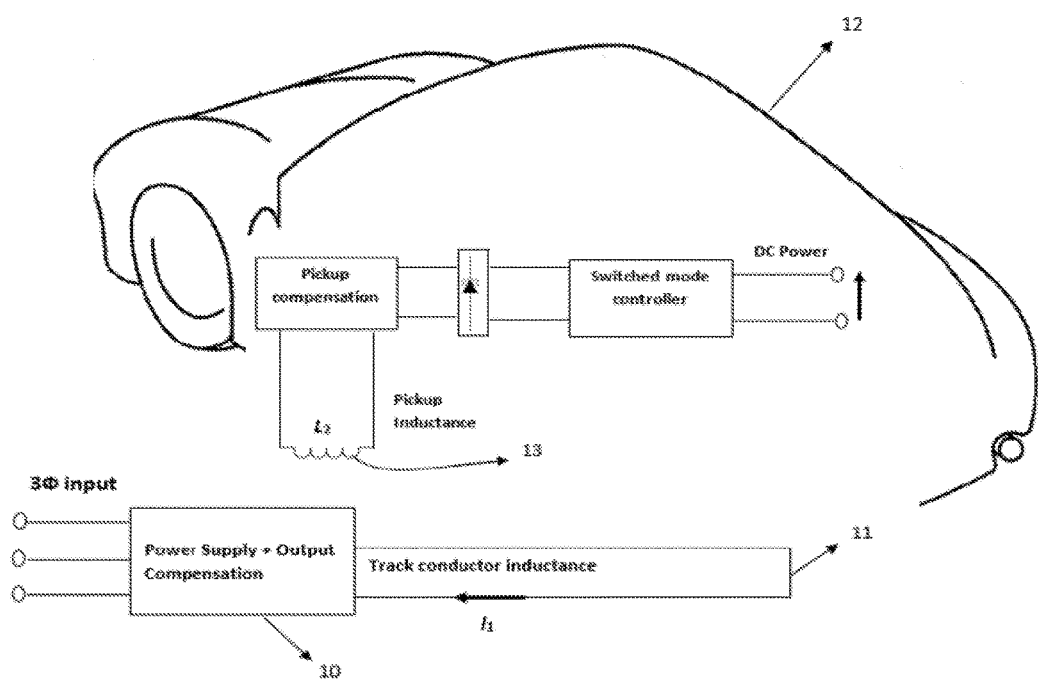
Figure 5 - A modern State of the Art EV

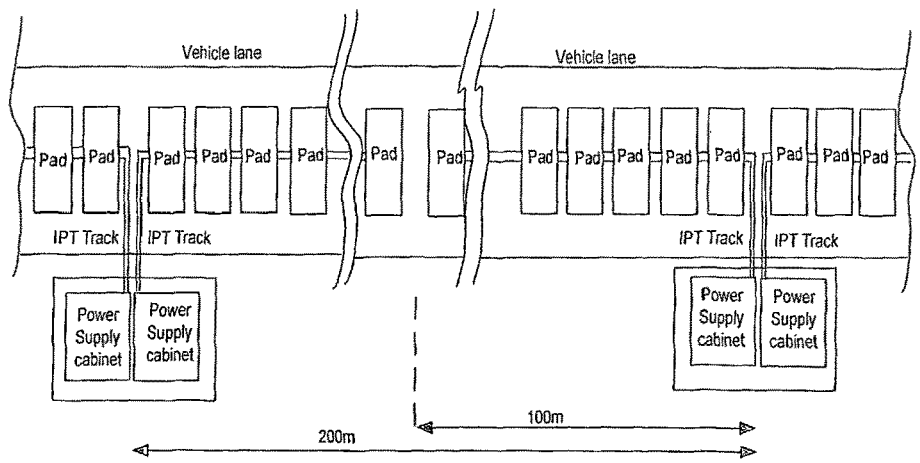
Figure 6: Arrangement of Pads along a Roadway
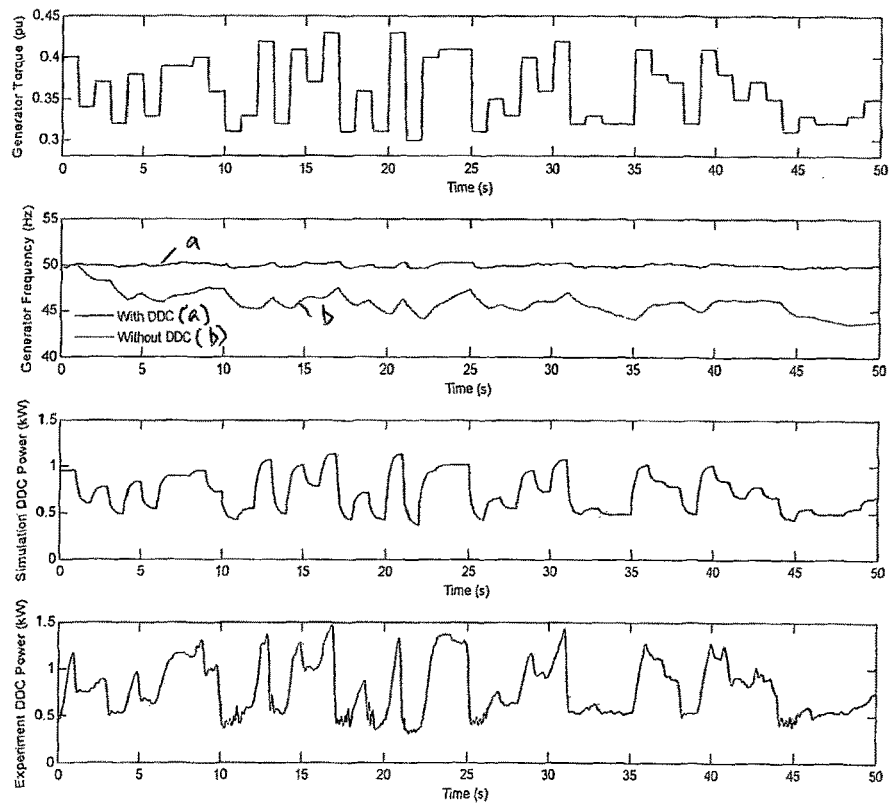
Figure 7 - Measured generator frequency and charging system output power with a DDC controlled IPT battery charging system and a random torque input.

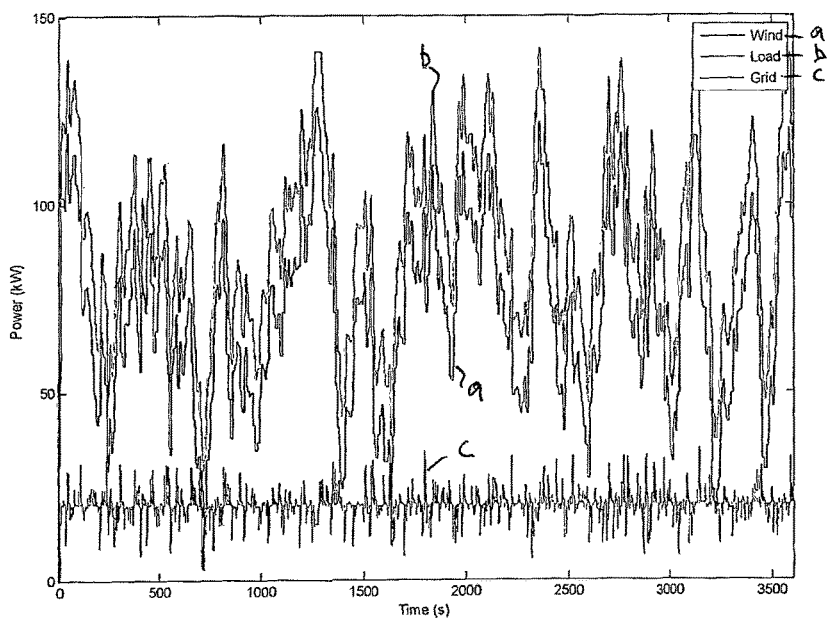
Figure 8 - Example plot of wind supply, grid supply and total consumption over a one hour period with a L DC controller.
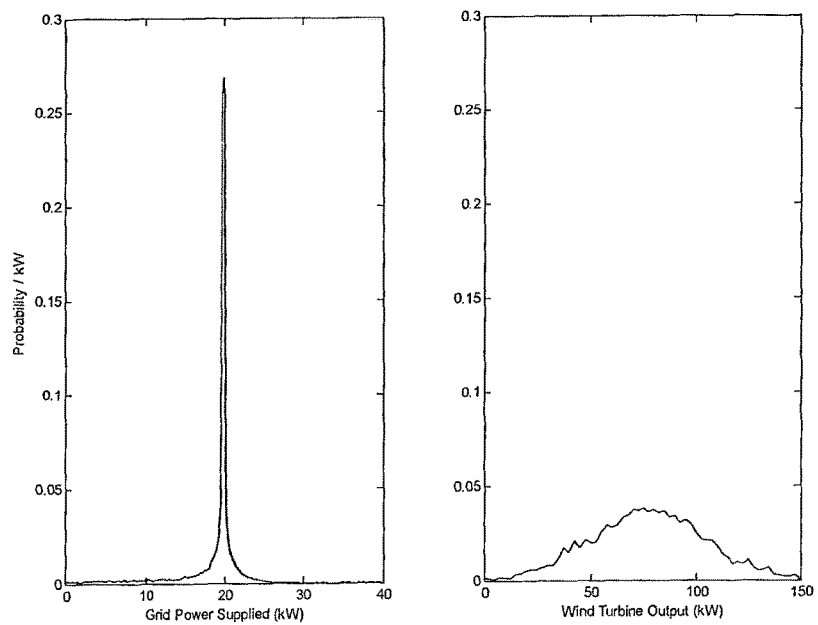
Figure 9 - Probability distribution of power consumed from the grid (left) and wind (right)

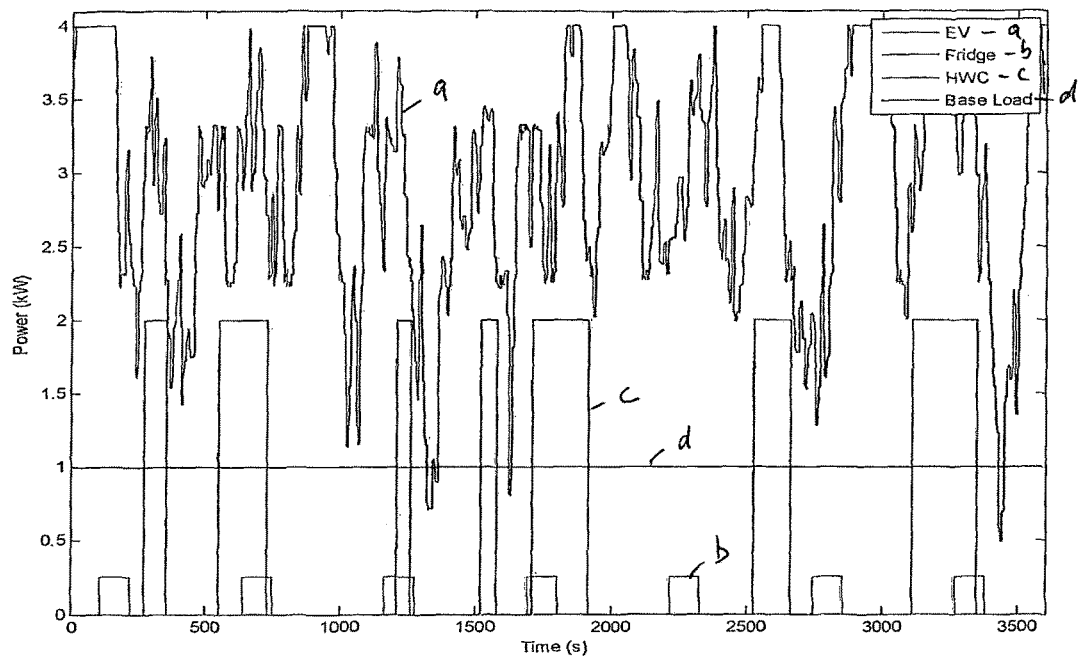
Figure 10 – Single household demand over one hour period
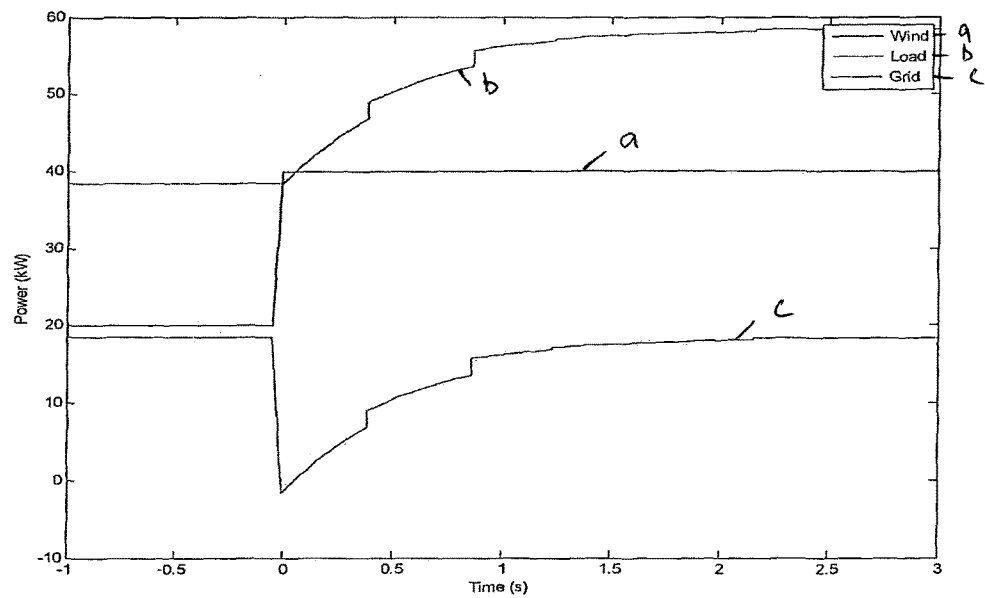
Figure 11 – Response of system to 20kW step in wind power.

US 9,954,361 B2

LOCAL DEMAND SIDE POWER MANAGEMENT FOR ELECTRIC UTILITY NETWORKS

This is a U.S. national phase application, which is based on, and claims priority from, PCT application Serial No. PCT/NZ2012/000050, filed Apr. 10, 2012, which claims priority from New Zealand Application Serial No. 592161, filed Apr. 8, 2011 and New Zealand Application Serial No. 594018, filed Jul. 12, 2011.

FIELD OF THE INVENTION

This invention relates to methods and systems for demand side power management in electrical utility networks. Applications of the invention include, but are not limited to, effective use of renewable energy generation resources and charging of electric vehicles.

BACKGROUND

Dynamic Demand Control (DDC) is conventionally known as a demand side management technique where the frequency of the utility supply, i.e. the grid frequency, is allowed to vary over a small range in response to fluctuations in the power being generated compared with the power being used at that moment. If the available power is too high the grid frequency is allowed to increase by a small amount; if the available power is too small the grid frequency is allowed to reduce. The grid may be viewed as a huge spinning load and these changes in frequency correspond to changes in the rotational speed of that load and are large energy fluctuations. If the frequency is too high then non-essential load can be switched on to absorb some of that energy; if it is too low then non-essential load can be switched off to free up spinning power for more important applications. Unless the context clearly requires otherwise, references to "DCC" herein refer to such a system.

In a practical situation a large number of small DDC capable loads, each with its own controller, are distributed over the network. As the network frequency varies each controller determines what load is called for and switches that fractional part load on. As shown in FIG. 1 if the frequency is less than 49 Hz the load switched is zero (W), if it is greater than 51 Hz the load is the full rated load, and between these two extremes the load varies linearly. Thus if there were 1 million of these devices on the network the actual load applied would be a resistive load variable from 0 to 2 GW. It should be noted that this is an example only and in practice the range 49-51 Hz would be a lot smaller, and not all the loads have to be the same. The prime requirement is that the DDC capable loads can be switched in a continuously variable way between 49 and 51 Hz—or at least switched on and off inside that range.

There are limitations on the type of load that can be made DDC compliant. In general 'energy' loads such as water heaters, battery chargers, freezers, refrigerators, and air conditioners are suitable but care must be taken where such loads include motors, pumps, and fans as rapid switching of these devices on and off may adversely affect their life. Nonetheless DDC compliant energy loads make up a significant fraction of the electric load on any grid system and make DDC an attractive technology to implement.

DDC is implemented in the simplest possible way by allowing the mains frequency to vary in response to loads. Schematically the whole grid can be replaced with a generator with inertia J and a load that varies with frequency shown in FIG. 2. A prime mover with no other controller drives the inertia J representing the Grid and DDC compliant loads (not shown) connected to the generator moderate the net torque driving the inertia J, via the feedback path.

As outlined above, DDC requires the grid frequency to be varied so that compliant loads may be switched on and off in a coordinated manner. A difficulty with implementation of DDC is reluctance on the part of utility operators to allow the grid frequency to vary because the grid is designed for operation at a constant frequency. Furthermore, there is a reluctance to implement DDC because that implementation must necessarily be on a large scale which means a significant investment from a number of parties.

OBJECT

It is an object of the invention to provide an improved demand side control method, system or process, or to at least provide the public with a useful choice.

SUMMARY

Accordingly in one aspect of the invention there is provided a demand side electric power supply management system comprising an islanded power system having a point of coupling to a supply grid, the islanded power system supplying a plurality of consumers, each consumer using one or more electric loads, each of the loads associated with a load controller to control the power demanded by that load in response to a control signal, a measuring means associated with the point of coupling to measure the total power transfer between the grid and the islanded system, and a system controller which monitors the measured power transfer into the islanded system relative to a set point and provides a control signal to one or more load controllers to prevent power transfer into the islanded system substantially exceeding the set point.

In another aspect the invention provides a demand side electric power supply management system comprising an islanded power system having a point of coupling to a supply grid, the islanded power system supplying a plurality of electric loads, each said load associated with a load controller to control the maximum power demanded by that load, a measuring means associated with the point of coupling to measure the total power transfer between the grid and the islanded system, and a system controller which monitors the measured power transfer into the islanded system from the supply grid relative to a set point and provides a control signal to a plurality of load controllers, wherein each load controller receives substantially the same control signal and determines the maximum power which the or each load associated with the load controller is allowed to draw from the islanded power system based on information contained in the control signal.

The load controller may prioritise its load(s) with respect to another load or other loads whereby a load of a first priority is controlled to draw power in preference to a load of a second priority for a given control signal. For example a load of a first priority is controlled to reduce demand after a load of a second priority in response to a change in the control signal to indicate that demand needs to be reduced. The priorities assigned to loads may be changed. In one embodiment priorities may be changed dependent on the function performed by the load.

The power flow into the islanded system may be substantially maintained at the set point.

In one embodiment the set point represents a base power requirement for the islanded system. The base power requirement may be established by the consumer(s) and/or by the load controller or a grid system operator. The base power requirement, and thus the set point, may be varied. This may be dependent upon factors such as the power requirements of the islanded system, the cost structure for power supplied by the grid, and the overall power demand on the grid i.e. the power available to the islanded system from the grid.

The islanded system may include one or more generators. In one embodiment, generation within the islanded system results in less power transferred from the grid, thereby causing the control signal to indicate that the loads may demand more power. In one embodiment, if all loads are fully supplied, then excess generation in the islanded system may be transferred to the grid.

In one embodiment the control signal is derived by measuring the total energy supplied to the islanded system compared with the energy that would have been supplied if the islanded system had operated continuously at the set point reference.

In a second aspect of the invention there is broadly provided a demand side electric power supply management system comprising an islanded power system having a point of coupling to a supply grid, the islanded power system supplying a plurality of consumers, each consumer using at least one load, each of the loads associated with a load controller to control the power demanded by that load in response to a control signal which is delivered to the load controller by a low latency communication system, a system controller which monitors power transfer to the islanded system relative to a set point for power transfer from the grid to the islanded system to thereby establish a differential power transfer, and provides a control signal to the one or more load controllers such that the differential power transfer substantially averages zero.

The load controller may prioritise its load(s) with respect to another load or other loads whereby a load of a first priority is controlled to draw power in preference to a load of a second priority for a given control signal. For example loads of a first priority are controlled to reduce demand after loads of a second priority in response to a change in the control signal to indicate that demand needs to be reduced. The priorities assigned to loads may be changed. In one embodiment priorities may be changed dependent on the function performed by the load.

The power flow into the islanded system may be substantially maintained at the set point.

In one embodiment the set point represents a base power requirement for the islanded system. The base power requirement may be established by the consumer(s) and/or by the load controller or a grid system operator. The base power requirement, and thus the set point, may be varied. This may be dependent upon factors such as the power requirements of the islanded system, the cost structure for power supplied by the grid, and the overall power demand on the grid i.e. the power available to the islanded system from the grid.

The islanded system may include one or more generators. In one embodiment, generation within the islanded system results in less power transferred from the grid, thereby causing the control signal to indicate that the loads may demand more power. In one embodiment, if all loads are fully supplied, then excess generation in the islanded system may be transferred to the grid.

In one embodiment the control signal is derived by measuring the total energy supplied to the islanded system compared with the energy that would have been supplied if the islanded system had operated continuously at the set point reference.

In a third aspect of the invention there is provided a method of demand side electric power supply management comprising the steps of:
  establishing a set point reference for power transfer from a supply grid to an islanded power system having a plurality of loads;
  monitoring power transfer from the grid to the islanded power system relative to the set point reference to thereby establish a differential power transfer;
  generating one or more control signals to control the loads present in the islanded system such that the differential power transfer substantially averages zero, and;
  providing the one or more control signals over a low latency communication system.

The method may include prioritising one or more loads with respect to another load or other loads whereby a load of a first priority is controlled to draw power in preference to a load of a second priority for a given control signal. For example loads of a first priority are controlled to reduce demand after loads of a second priority in response to a change in the control signal to indicate that demand needs to be reduced. The priorities assigned to loads may be changed. In one embodiment priorities may be changed dependent on the function performed by the load.

The method may include maintaining power flow into the islanded system at a substantially set point.

In one embodiment the set point represents a base power requirement for the islanded system. The base power requirement may be established by the consumer(s) and/or by the load controller or a grid system operator. The base power requirement, and thus the set point, may be varied. This may be dependent upon factors such as the power requirements of the islanded system, the cost structure for power supplied by the grid, and the overall power demand on the grid i.e. the power available to the islanded system from the grid.

The islanded system may include one or more generators. In one embodiment, generation within the islanded system results in less power transferred from the grid, thereby causing the control signal to indicate that the loads may demand more power. In one embodiment, if all loads are fully supplied, then excess generation in the islanded system may be transferred to the grid.

In one embodiment the control signal is derived by measuring the total energy supplied to the islanded system compared with the energy that would have been supplied if the islanded system had operated continuously at the set point reference.

In a fourth aspect the invention provides a demand side electric power supply management system controller having:
  means to monitor power transfer from a supply grid to an islanded power system having a plurality of loads;
  means to compare the power transfer from the grid to the islanded power system relative to a set point reference for power transfer from the grid to the islanded system to thereby establish a differential power transfer power flow into the islanded system; and
  means to generate a control signal for transmission over a low latency communication system to control loads present in the islanded system such that the differential power transfer substantially averages zero.

The load controller may prioritise its load(s) with respect to another load or other loads whereby a load of a first priority is controlled to draw power in preference to a load of a second priority for a given control signal. For example loads of a first priority are controlled to reduce demand after loads of a second priority in response to a change in the control signal to indicate that demand needs to be reduced. The priorities assigned to loads may be changed. In one embodiment priorities may be changed dependent on the function performed by the load.

The power flow into the islanded system may be substantially maintained at the set point.

In one embodiment the set point represents a base power requirement for the islanded system. The base power requirement may be established by the consumer(s) and/or by the load controller or a grid system operator. The base power requirement, and thus the set point, may be varied. This may be dependent upon factors such as the power requirements of the islanded system, the cost structure for power supplied by the grid, and the overall power demand on the grid i.e. the power available to the islanded system from the grid.

The islanded system may include one or more generators. In one embodiment, generation within the islanded system results in less power transferred from the grid, thereby causing the control signal to indicate that the loads may demand more power. In one embodiment, if all loads are fully supplied, then excess generation in the islanded system may be transferred to the grid.

In one embodiment the control signal is derived by measuring the total energy supplied to the islanded system compared with the energy that would have been supplied if the islanded system had operated continuously at the set point reference.

In a fifth aspect the invention provides a method of demand side electric power supply management comprising the steps of:
  assigning a priority to each of a plurality of loads in a power system;
  receiving a control signal indicative of the power available to the power system; and
  controlling the loads dependent on the control signal and the priority assigned to each load whereby a load of a first priority is controlled to draw power in preference to a load of a second priority for a given power availability indication from the control signal.

In one embodiment the power system comprises an islanded power system.

The control signal may be provided using a low latency communication system. The control signal may comprise the frequency of operation of the power system.

The islanded power system may receive power from a grid supply.

In a sixth aspect the invention provides a load controller for a demand side electric power supply management system, the controller comprising:
  means to store a priority designation for one or more loads;
  means for receiving a control signal, the control signal indicative of the power available to a power system which supplies the one or more loads; and
  means to control the one or more loads dependent on the control signal and designated priority assigned to that load.

In one embodiment the load controller stores a priority designation for each of a plurality of loads and controls the loads dependent on the control signal and the designated priority whereby a load of a first priority is controlled to draw power in preference to a load of a second priority for a given power availability indication from the control signal.

In one embodiment the power system comprises an islanded power system.

The control signal may be provided using a low latency communication system. The control signal may comprise the frequency of operation of the power system.

The islanded power system may receive power from a grid supply.

In a seventh aspect the invention broadly provides an appliance for use with a demand side electric power supply management system, the appliance comprising:
  means to store a priority designation;
  means for receiving a control signal, the control signal indicative of the power available to a power system which supplies the appliance; and
  means to control the power demand of the appliance dependent on the control signal and designated priority.

In an eighth aspect the invention broadly provides a demand side electric power supply management system comprising an islanded power system having a point of coupling to a supply grid and a variable power supply from a generator connected to the islanded system, the islanded power system supplying a plurality of consumers, each consumer using at least one load, each of the loads associated with a load controller to control the power demanded by that load in response to a control signal which is delivered to the load controller by a low latency communication system, a system controller which provides a control signal to the one or more load controllers such that the power from the generator is preferentially supplied to energy loads.

In a ninth aspect the invention broadly provides an electric vehicle power supply management system comprising an islanded power system capable of supplying power to a plurality of electric vehicle loads and having a point of coupling to a supply grid, each of the loads associated with a load controller to control the power demanded by that load in response to a control signal which is delivered to the load controller by a low latency communication system, a system controller which monitors power transfer to the islanded system relative to a set point for power transfer from the grid to the islanded system to thereby establish a differential power transfer, and provides a control signal to the one or more load controllers such that the differential power transfer substantially averages zero.

In one embodiment the electric vehicle loads are inductively coupled to the islanded power system.

In one embodiment the islanded system is arranged to provide power inductively to the electric vehicle loads when the electric vehicles are on a vehicle carrying surface such as a garage floor, carpark or roadway.

In a tenth aspect the invention provides a method of demand side electric power supply management comprising the steps of:
  assigning a priority to each of a plurality of loads in a power system;
  receiving a control signal indicative of the power available to the power system;
  monitoring a characteristic of at least one of the loads; and
  reassigning the priority for one or more of the loads dependent on the control signal and the monitored characteristic.

The monitored characteristic may include one or more of: the power presently demanded by the load; the state of charge of the load; whether the load has been switched off or on by a user.

In one embodiment the power system comprises an islanded power system. The control signal may be provided using a low latency communication system. The control signal may comprise the frequency of operation of the power system.

The islanded power system may receive power from a grid supply.

In an eleventh aspect the invention provides a demand side electric power supply management system comprising an islanded power system having at least one point of coupling to a supply grid, the islanded power system supplying a plurality of electric loads, each said load associated with a load controller to control the maximum power demanded by that load, the system further comprising measuring means associated with the or each point of coupling to measure the total power transfer between the grid and the islanded system, wherein each load controller determines the maximum power which the or each load associated with the load controller is allowed to draw from the islanded power system based on a comparison of the measured power transfer into the system with a set point.

Further aspects of the invention, which should be considered in all its novel aspects, will become apparent from the following description.

DRAWING DESCRIPTION

Figure 13:
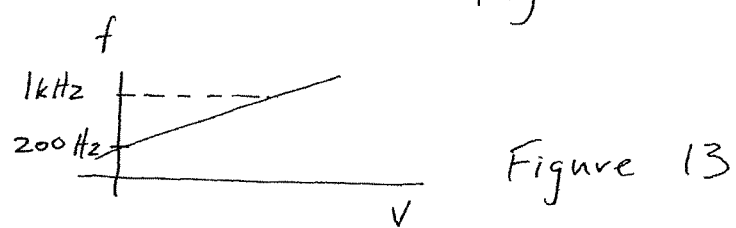
Figure 14:
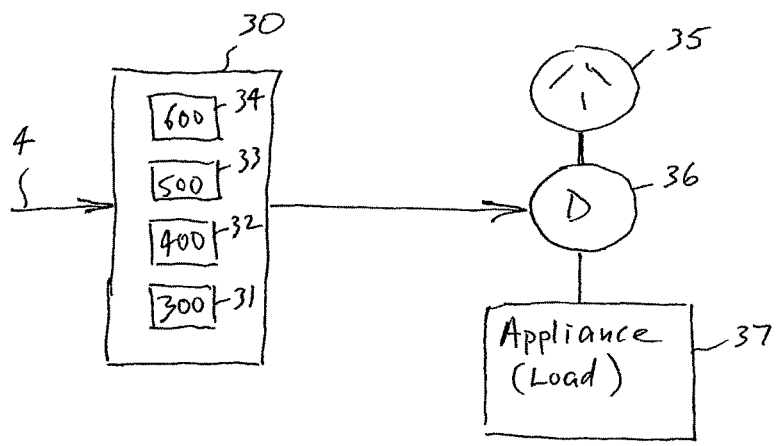
Figure 15:
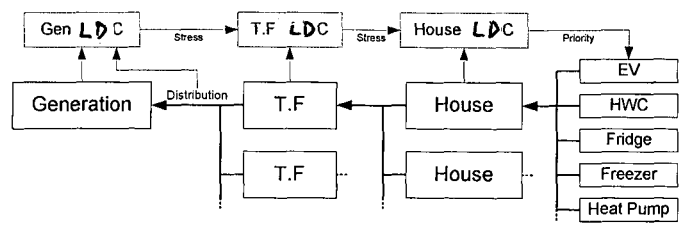
Figure 16:
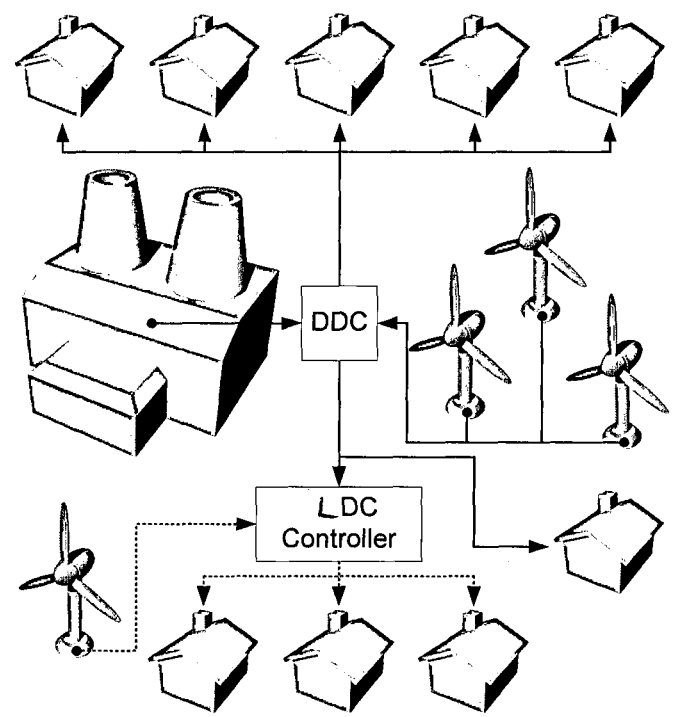
Figure 17:
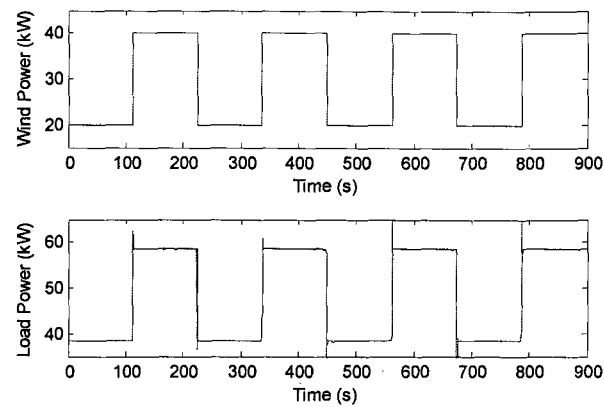

One or more embodiments of the invention will be described below with reference to the accompanying drawings, in which:

FIG. 1: is a graph of Power versus frequency for a known 1 kW DDC Controller;

FIG. 2: is a Block diagram, and transfer function of a known DDC controller;

FIG. 3: is a generalised schematic diagram of a LDC system according to the invention;

FIG. 4: is a Block diagram, and transfer function of a known DDC controller;

FIG. 5: is a diagrammatic illustration of an inductively powered electric vehicle;

FIG. 6: is an illustration of a roadway for inductively powered vehicles;

FIG. 7: is a series of graphs showing measured generator frequency and charging system output power with a DDC controlled IPT battery charging system and a random torque input;

FIG. 8: is a graph showing an example plot of wind supply, grid supply and total consumption over a one hour period with an LDC controller;

FIG. 9: shows two probability distributions, one for power consumed from a grid and the other for power consumed from wind;

FIG. 10: is a graph showing single household demand over a one hour period;

FIG. 11: is a graph showing the system response to a 20 kW step in wind power;

FIG. 12: is a diagram of an islanded power system illustrating generation and use of a variable frequency control signal;

FIG. 13: is a diagram of frequency against voltage for generation of the control signal in the system shown in FIG. 12;

FIG. 14: is a diagram showing operation of a load control device;

FIG. 15: is a diagram showing information flows in an LDC island according to one embodiment of the invention;

FIG. 16: is a diagram illustrating an example of a hybrid system which integrates DDC and LDC;

FIG. 17: shows plots of wind power and load power over time; and

Figure 18:
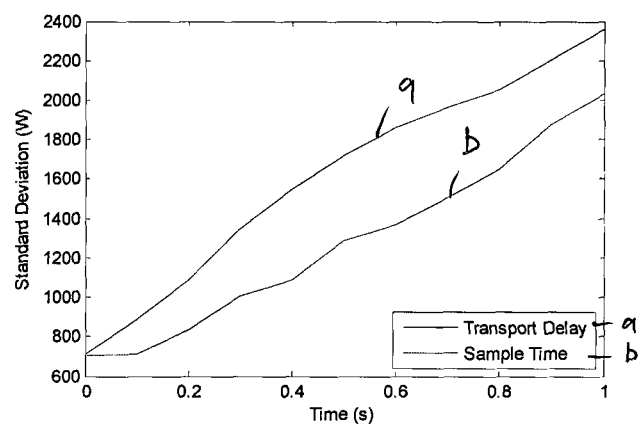

FIG. 18: shows plots of standard deviation against time for Transport Delay and Sample Time in respect of the simulation relating to FIG. 17.

DESCRIPTION OF ONE OR MORE EMBODIMENTS

A new approach to dynamic demand side control will now be described. In one embodiment this new approach allows the mains frequency to be constant and also allows for local Distributed Generation (DG), as shown in FIG. 3. This approach may be considered to be a form of distributed generation demand control, but for convenience this approach is referred to in this specification as Local Demand Control (LDC). In essence, a load in an islanded system that has a connection point to the grid is controlled to prevent the power supplied from the grid to the islanded system from substantially exceeding a set point. The term "islanded system" is used in this document to refer to a power system or subsystem that may or may not include generation and which has at least one point of coupling to a utility supply grid. An islanded system may supply power to a plurality of consumers who use loads (for example domestic appliances), or possibly share a load, connected to the system. In one example an islanded system may comprise a single household, and in another example may comprise a city. In another example an islanded system can be defined by a number of households which are not necessarily located in the same immediate geographical area collectively agreeing to form an islanded system for the purposes of implementing the invention.

One example of implementation that will be set forth below is that of an islanded system comprising a small community such as a farm or a small village. However, as noted above the system is also applicable on an even smaller scale, such as an individual dwelling. Similarly, the invention may be implemented on large scale islanded systems such as a city.

In the case of a farm for example, power is available from the grid 1 but it may be at the end of a long feeder that also drives other isolated farms, so that it is weak and highly variable. This single, or sometimes three-phase, feeder cannot drive large loads without disrupting the power supply to neighbours so the idea of charging one or more electric vehicles at perhaps 7 kW is not practical. In the example here the islanded system includes a generator, so power from the utility supply grid is available in addition to locally generated power. Locally a wind-turbine 2 drives a single phase induction generator 3 to produce single phase power. Three phase power can also be generated. The power available on the farm is then the power from the utility feeder—say 15 kW—and the power from the wind-turbine which might be only 20 kW in a small application, and which varies widely as the wind strength varies.

A set point reference can be established for the power available from the utility feeder. Thus the set point represents a base power requirement for the islanded system. The base power requirement may be established by the consumer(s) and/or by a load controller or a grid system operator, as discussed further below. The base power requirement, and thus the set point, may be varied. This may be dependent upon factors such as the power requirements of the islanded system, the cost structure for power supplied by the grid, and the overall power demand on the grid i.e. the power available to the islanded system from the grid. In one example, the system demand on the grid can be monitored and then the set point can be adjusted based on the demand trend when the next utility billing period begins. Thus if the utility bills in half hour periods, then the set point may be adjusted to coincide with the commencement of the next half hour period. The system may signal the intended change in set point to the grid system operator in advance of the change.

The available power is the sum of the set point power from the grid and the generation within the islanded system at any instant. A control signal which is indicative of the available power may be added in common to all the phase voltages of the local system from a system controller 5. The power transferred into the islanded system may be monitored compared with the set point to establish a differential power transfer, and this differential power transfer may be controlled by appropriate load control to average zero. In one embodiment the control signal is derived by determining the energy transferred to the islanded system from the grid over and above the energy that would have been taken had the system operated continuously at the set point. This difference may be represented by a voltage, and used to generate a control signal as discussed further below.

Further detail is shown in FIGS. 12 to 14. The system controller 5 may produce a voltage from which a control signal is generated using a voltage to frequency converter 21. In this example the control signal is a simple tone—e.g. 1 Volt varying from 200 Hz to 1 kHz, as shown in FIG. 13, corresponding to a "guaranteed" lower power limit to 20 kW perhaps. Each appliance 37 or household 9 for which the system is implemented is associated with a load controller, such as controller 30, which receives the common control signal described above and controls the appliance or appliances 37 accordingly. Referring to FIG. 14, one example of a load controller implementation is shown in which the load controller 30 has filters 31 to 34 (and possibly more) that correspond to different load switching or operation priorities. A dongle 36 is provided connected between the controlled load, such as appliance 37, and the supply (in FIG. 14 represented by power outlet socket 35). Dongle 36 includes a switch to enable on/off or variable control and is responsive to an instruction from load controller 30 to increase or decrease the demand of the appliance 37, or other load, to which it is connected. Communication between the dongle 37 and the load controller may occur over a wireless network in one embodiment. As an alternative, the functionality of the controller may instead be included in dongle 36 so that separate controller hardware is unnecessary. The controller or dongle 36 may be provided as part of the appliance, so that separate hardware is unnecessary.

Thus, any relevant appliance or electrical device will then turn on/off (or have its demand controlled variably if that is possible or appropriate for the given load type or function the load performs) as the control signal frequency varies in response to more or less power becoming available as the wind speed varies, and as other loads turn on or off. The control signal may also be a digital signal propagated by wire or wirelessly over the farm or the community. All the LDC compliant devices get it at substantially the same time and turn on/off appropriately. Therefore, the control signal must be transmitted by a low latency system. In FIG. 3 the control signal is shown as being generated at the local transformer. This is a convenient practical location for such a controller as it can measure the power supplied from the grid at this point. However it will be appreciated that the load controller could be located at another physical location, and may even be located remote from the islanded system. The control signal may be provided by means other than that described above. For example, a wireless communication system or network could be used. Thus the communication of the control signal may occur by varying the system frequency, by radio signals, by WiFi or Zigbee, or by Internet for example.

As mentioned above, each load may be designated a priority. The order of priority is whatever that community, or individual consumers in that community, want. Setting priorities should be considered carefully as devices at the high power end are likely to be turned on and off relatively often and some devices—e.g. refrigerators—are not rated for rapid switching. Devices which consume relatively low amounts of power can be put at the low power end of the priority list. Those for which frequent on/off switching is undesirable can include an operation schedule which prevents a switching action for a certain time period. For example a schedule for a certain load (such as a refrigerator) may include a schedule which requires that whenever that load is switched on/off it must stay on/off for at least 10 minutes or until it turns itself off. The priority for each appliance can be stored in each load controller in such a manner that it can be varied either by a user or varied intelligently by the load controller depending on parameters such as the function performed by the load. The consumer and/or the "community" in the islanded power system can decide on load prioritisation. For example in FIG. 3 each household is shown with a water heater load 6 and an electric vehicle (EV) charging load 7. If a consumer has chosen the EV load 7 to ordinarily have a lower priority than the water heater load 6, then load 7 will ordinarily be switched off in preference to load 6 as the control signal indicates that the available power supply is diminishing. However, the load controller may change the priority if it determines (or receives feedback indicating) that the EV charge is very low for example, or the water temperature is sufficient (even if it is not optimal), or dependent on the time of day (for example cutting water heating in the middle of the night in preference to vehicle charging and recommencing water heating at an appropriate time). Both loads 6 and 7 are of a type that can be controlled to be continuously variable, and the load controller may perform that function. It will be seen that the system of prioritisation described herein is applicable to DDC in general and is not necessarily limited to use in an islanded power system as the control signal that is used may be the frequency of the power system. It will be seen that "energy" loads, which are tolerant to power supply variability, such as water heating and EV charging can be prioritised so that the variable generation from the generator 3 is effectively used to supply those loads. Thus the invention can make good use of variable generation such as that from renewables including wind, solar, and tidal generation sources for example.

In the form described above with the wind-turbine driving an induction generator both the voltage and the frequency are set by the grid. The power taken from the grid can be reduced to zero and power can even be exported back to the grid if the power is not actually being used i.e. if all loads are being supplied as required. Indeed in larger applications the System Operator (SO) for the islanded system can ask for the grid power to be reduced, if possible, or a higher 'time of day' pricing schedule might be incurred. If there is a surplus that is not wanted by the SO it can be used for water heating or dumped. In one embodiment a set point reference can be established for the power delivered to the islanded system from the grid (the feeder in the farm example described above) and the controller can provide a control signal to the controllable loads so that the power delivered to the islanded system does not exceed, or at least does not substantially exceed) the set point. Furthermore, dependent on the nature of the loads supplied by the islanded system and the generating capacity in the islanded system, the islanded system may be managed so that the power delivered from the grid is substantially maintained at the set point, at least for certain time periods. In this way the demand placed on the grid is more predictable, with less unexpected change in demand, so spinning reserve can be lessened or at least be more economically managed by the grid operator.

In some systems, for example those with relatively low power usage and high generation capacity, the islanded system may operate to feed a substantially constant amount of power into the grid.

A significant feature is that fluctuations in the wind speed causing variations in the power being generated are essentially removed by the LDC controller so that if power is programmed to be sent back to the Grid then it will be high quality constant voltage grid frequency single phase or 3 phase which has a high value. However if power is sent back to the grid because there is insufficient load to absorb all of the power available it will be lower quality and consequently of lower value. In the event of a power cut this system cannot generate as the induction generators will have insufficient VAR excitation; this is by far the lowest cost implementation and also the safest as the local generation cannot enliven a line that the power company has turned off for whatever purpose. Where power continuity is essential—e.g. for a dialysis machine—a UPS could be used.

A controller for this LDC system is shown diagrammatically in FIG. 4. It is similar to the controller shown in FIG. 2 except that the feedback path is now completely in the induction generator. In these circumstances the output $\Delta\omega$ is now a change in the slip frequency of the machine causing a torque feedback of $$\frac{\Delta\omega}{\omega_{S0}} T_0$$

where $\omega_{S0}$ is the rated slip frequency of the induction machine and $T_0$ is the rated torque. This gives a transfer function $$\frac{\Delta\omega}{\Delta T} = \frac{\frac{\omega_{S0}}{T_0}}{1 + s\frac{J\omega_{S0}}{T_0}}$$

This transfer function corresponds to a first order system with a short time constant so that the expected system response is fast with no overshoot.

A comparison between a conventional DDC controller and the LDC controller is shown in Table 1. The significant differences are that some embodiments of the LDC system need an extra communications feed to the LDC compliant devices, but it can run in a mixed power mode where power is taken from the grid and the wind turbine at the same time. The conventional DDC system is essentially a stand-alone system best implemented with a synchronous generator whereas LDC operates as an island in a grid system but with its own internal controller and is best implemented with an induction generator. Conventional DDC is responsible for its own frequency and voltage control whereas LDC takes its voltage and frequency from the grid but power can go in either direction and changing the direction of power flow is simple and seamless.

TABLE 1

A comparison between controllers

| Attribute | DDC | LDC |
|---|---|---|
| Run Stand-alone | Yes | No |
| System frequency | Local control | Grid |
| Voltage regulation | Local control | Grid |
| Mixed Power Mode | No | Yes |
| Frequency range | 50 ± 0.2-0.5 Hz | Grid 50 ± 0.2 Hz |
| Response | $2^{nd}$ Order | $1^{st}$ Order |
| Damping factor | Inertia critical | Inertia not critical |
| Generator | Synchronous preferred | Asynchronous preferred |
| Switch to Grid Power | Complex system | Seamless |
| VAR controller needed | No | No |
| Phases | 1 or 3 | 1 or 3 |
| Response time | <1 second | <1 second |
| Cost | High | Lower |

The most significant difference between the machines and their controllers is possibly the inertial requirements. Wind machines are relatively low inertia and the LDC system can operate with low inertia. Conventional DDC systems need approximately 0.02 kg·m$^2$ of inertia for each 2 pole kW. Thus a 12 pole 1 kW machine needs 0.72 kg·m, and a 12 pole 100 kW machine therefore needs 72 kg·m$^2$. These inertias may be quite difficult to achieve but without them the damping of a conventional DDC controller may be poor. The LDC controller is helpful in this respect.

As mentioned with reference to FIG. 3, the invention also has application to Electric Vehicles (EV's), both for charging and roadway power requirements. Examples of EV inductive charging and inductive roadway use are described in our published pending applications WO008/140333 and WO2011/016736. Although these publications predominantly refer to inductive coupling of vehicles to a power system, it will be appreciated that the present invention may find application to either inductive or non-inductive coupling mechanisms.

Referring to FIG. 5, an EV which is charged inductively is shown. A stationary power supply 10 energises a track or pad 11 in or on a floor or roadway. The vehicle 12 has a pick-up coil 13 and the electric energy transferred to the pick-up is conditioned and provided as DC power for use with charging and/or operating the EV.

Referring now to FIG. 6, when EV's are in motion along the road 20 they can be powered inductively from an 'endless' string of pads 11 buried in the roadway. These pads are powered by power supplies 10 spaced perhaps 200 m apart and driving 100 m of roadway in each direction. As a vehicle moves along this road 20 the pad(s) 11 underneath it are energised synchronously with its motion providing a power wave that keeps the vehicle fully charged. Each pad produces an arched flux across the roadway that switches from pad to pad as the vehicle moves. The vehicle is powered at 10-20 kW depending on whether one pad or two is providing linking flux and this power is sufficient to power the vehicle and keep the battery fully charged. Each 100 m section may or may not have a vehicle on it—if there is no vehicle then this section switches off. Conversely each section may have 5 cars at 20 kW each with 20 m spacing between the vehicles. If there are more vehicles then the section is overloaded and a DDC system is used to reduce the power to each vehicle so that the system does not collapse. The power supplies 10 provide an IPT frequency of 20 kHz; this 20 kHz is varied between 19.9 and 20.1 kHz to indicate the loaded condition of the section—at 20.1 kHz the vehicles take full power, at 19.9 kHz they take reduced power in a classical DDC situation. These sections of roadway could be driven from a mains supply or from local wind or other 'green' sources. Thus these systems may comprise islanded power systems to which the invention is applicable. Overloaded sections trigger a signal 'congestion—increase spaces between vehicles' to the driver.

Similar applications—though a lot simpler—will exist in car park buildings that offer parking and charging. Here one power supply 10 can drive a lot of pads 11 and charge many vehicles at the same time to give a simpler arrangement than one power supply and pad per parking space as in a garage or parking place at home.

Measurements and Simulations

1. Simulation of a Battery Charger with DDC and IPT Coupling

A classical DDC controller has been tested under laboratory conditions and by computer simulation. In the laboratory a controlled AC drive in a torque controlled mode generated a string of random torques changing each second. The AC drive (variable speed induction motor) was connected to a 3 phase alternator generating at 50 Hz. Two of the phases were on resistive loads, and the third phase was passed to a DDC controller set up to charge an electric vehicle battery at 300 V DC. The measured and computer simulated outputs are shown in FIG. 7. The system was controlled by the DDC controller at 1000 rpm with a 4 pole induction motor and a 6-pole alternator. A huge advantage of this experimental set-up is that the same random sequence can be used for all of the tests.

The first graph shows the random torque signal used. The second graph shows the generator frequency (equivalent to shaft speed) with and without DDC control, and the third graph shows the current into the battery (with DDC control). Since from graph 2 the speed with DDC is essentially constant the power input is a scaled version of the first graph and the power output, with a constant voltage battery, is a scaled copy of the battery current. Thus ideally graphs 1 and 3 should be the same—the correlation between them is exceptionally good showing the accuracy of the DDC controller. The 4$^{th}$ graph shows a simulation on Simulink™ for the expected battery current from the circuit. It is a close fit to the measured data with the same average current and slightly less variation showing that the inertia figures for the experiment and the simulation are not quite identical.

2. Simulation of the Power Used in a Small Community

An LDC system can be used in many circumstances wherever there is a community of common interest. Perhaps the simplest is a 400/230 V distribution transformer where all the consumers on the transformer form the LDC system. Here there is no wind power but the transformer load may be monitored and the connected houses switch LDC compliant loads so that the total load of all the houses is managed. In this way the load presented by this transformer to the 11 kV feeder is almost constant. The transformer operates at a higher load factor and problems of residential infilling are greatly reduced. Also the electronics can monitor the supply frequency and if it is too low it can drop all non-essential loads, and if it is too high it can switch on all possible loads.

Here in a slightly more complex situation described in Section 5 the power demand for a small community comprising twenty houses containing LDC compliant loads and EV IPT charging pads has been performed where mains power to a nominal maximum amount of 20 kW (1 kW/house) is included. Wind power is added as a random sequence, changing every ten seconds, with an average value of 70 kW. The load taken by each household averages 3.5 kW, but can peak at up to 7 kW. This system therefore includes 77% wind which is very high.

Central to the system is the LDC controller which measures power flow to the grid and compares this with a known limit or set point reference. A simple integral controller may then be used to determine the difference between the energy supplied to the islanded system compared to the energy that would be transferred if power were being supplied at the set point and uses this to produce a differential power signal which is provided to the system as a power priority signal that varies from 0 to 10 in real time. The most important device is priority 1, whilst the least is priority 10. Consequently, devices with priorities below the signal will stay on whilst those above will be switched off. The control is thus implemented so that the differential power, i.e. the difference between the power supplied from the grid and the set point power reference is substantially zero on average.

Each house consists of a number of LDC controlled loads. These are listed in Table 2.

TABLE 2

Simulated loads in each household

| Load | Average Power | Peak Power | Priority |
|---|---|---|---|
| EV Charger | 2 kW | 4 kW | 4-10 |
| HWC | 500 W | 2 kW | 4-9 |
| Refrigerator | 60 W | 250 W | 1-6 |
| Base Loads (x4) | 250 W | 250 W | 1, 2, 3, 4 |

All loads except the base loads will vary linearly over their given priority range, consuming minimum power at a lower priority signal. The four 250 W base loads are simply switched off if the signal goes below their given priority. A small random offset is given to each of these so that not all houses' base loads of equal priority switch at exactly the same time.

An example of the simulation output is shown in FIG. 8. It can be seen that the wind varies significantly but the load on the system is kept in step with this varying wind. The power drawn from the grid is regulated to 20 kW. The probability density functions for the power taken from the grid and the power generated from the wind are shown in FIG. 9. The left plot shows the power supplied from the grid and gives an idea of regulating efficiency. The right plot gives an idea of the range of the power output from the wind turbine. Note that the grid power is almost constant at 20 kW with deviations caused by loads switching on and off. The wind power is a roughly Gaussian distribution with a wide standard deviation—the ideal result would perhaps be a Weibull distribution p(x) where x is the wind speed, modified to $x^3$ to represent the power output demand in approximately one second.

FIG. 10 shows the power usage over 1 hour for a single house. Here the power taken is quite volatile but when combined with all the other houses the % variation can be improved considerably. It can be seen that the fridge and hot water cylinder modulate their switching times to coarsely adjust demand, while the EV charger fills in the gaps. In this way a large load with continuously variable control is seen to be important to the controller strategy.

The response of the system to a step in wind is shown in FIG. 11. The system adds 20 kW of demand in about three seconds in a predictable first order response with no overshoot. It can be observed that this response is made of steps in load and more continuously variable load as a function of time. The smaller loads are simply switched on and off depending on the availability of power while the larger EV and water heating loads are continuously variable and take power depending on the amount of power available making the overall response more linear.

FIG. 15 shows another example of the layout and information flows in a fully LDC island which includes generation, distribution and a number of houses all with LDC controllers. Here each LDC controller outputs a signal based on both the signal from the parent node and the power throughput measured locally, that is, the "set point" of the system controller of the islanded system can be varied, possibly continuously, based on information from the grid which indicates the total load on the grid. While deploying LDC network wide would be a significant task, the system works just as well in isolation. A hybrid of DDC and LDC would also be very easy to implement and is shown in FIG. 16.

In FIG. 16 the system frequency is used as the signal to LDC controllers built into transformers (not shown). The LDC controller then takes this into account when calculating the control signal for subsequent devices running off that transformer. In this way, the LDC system would help balance both overall supply and demand with DDC and manage local constraints with LDC.

In general usage of DDC and LDC can be categorised into three main usage scenarios based mainly on size as shown in Table 3. As DDC requires allowing the frequency to vary, it is most useful in islanded grids. These could be large systems such as the North Island of New Zealand or small isolated systems such as remote villages. Alternatively, LDC is suitable in mid-size systems where the frequency may not be allowed to vary or may not represent the generation constraints of the grid. A community with local wind generation is a good example of this.

TABLE 3

DDC USAGE SCENARIOS

| Type | Example | Constraint | Possible Signal | Operating Goal |
|---|---|---|---|---|
| Grid wide (DDC) | North Island | Total generation | Grid frequency | Balance supply and demand |
| Localised (LDC) | Single street, Farm community | Transformer, Grid interconnect | Local tone or similar | Keep within ratings |
| Isolated (DDC) | Island village | Local generation | Grid frequency | Fully utilise renewable source |

Depending on what transmission method is used to transmit the control signal, transport delays and sampling of the LDC control signal may be unavoidable. This could be introduced by analogue filtering or using digital communication.

In order to quantify the effects of latency and sampling of the LDC control signal, a modified version of the simulation mentioned above was run. The simulation was run for 15 minutes with a square-wave modulated wind turbine output. The turbine output changes between 20 kW and 40 kW four times during the simulation as shown in FIG. 17. Two separate tests were done. In the first, an analogue delay was introduced that varied between 0s and 1s.

In the second test a sample and hold was added to the priority signal, with the sampling period also varying between 0s and 1s. In each, the system performance was measured with each change in delay or sampling rate.

As the LDC controller is trying to regulate the grid interconnect power to a specific level, the variation is a good measure of how well the LDC system is performing. In order to get the best performance from the LDC controller, the integrator gain was modified with each change in delay or sample time in order to avoid overshoots or oscillations caused by the transitions. The results of both tests are shown in FIG. 18.

It can be seen that the ability of the LDC system to regulate power consumption is almost linearly related to any transport delay or sampling in the system. For this reason, the LDC signal needs to be transmitted as fast as possible in order to get maximum performance. A delay of between 0.1 and 0.2 seconds is a realistic goal and this still yields good performance. It can also be seen that sampling rate has less of an effect on system performance than transport delay. A sampling period of <100 ms (>10 Hz) is sufficient for a good performing system. These figures put limitations on the size of a network that might be served by a LDC controller in real-time. DDC is appropriate for levels up to grid scale but LDC may be best restricted to small islands within that DDC grid.

The basic circuitry required for the LDC controller functionality can be described with reference to a system that in one embodiment includes a wattmeter and Modulator, Dongles, and a House Controller. These are discussed in more detail below.

1. Wattmeter and Modulator.

Quantity: 1 per system

Location: ideally (but not necessarily) near the point of common coupling to the grid.

Power requirements: self powered

Inputs: 3-phase 3 wire mains supply

Output: Single turn coupling to the neutral wire on the output 3 phase 4 wire system before the neutral wire is earthed.

Description:

Conceptually this device measures the power taken from the 3-phase 3-wire mains supply and gives an isolated output. For an experimental version the input is 3 phase, 400 V, 50 Hz, current 3-4 A. Output scaled 0-3 kW equals 0-3 volts.

Included with the device should be a set point input of for example 0-3 Volts=0-3 kW and an integrator that can take the integral of the voltage difference between the wattmeter and the set point with an output scaled to be 0-10 V. This 0-10 V signal is to be used to control a V to F converter working over the range 0 V=600 Hz, 10 V=1,000 Hz which signal is then used to produce a 1 V signal on the neutral wire of the 3 phase system. The 1 V signal will be injected on to the neutral wire using a small inverter and a 100:1 transformer. Ideally the waveform should be a sine-wave but a square wave could be acceptable.

In a first Laboratory scale prototype all of these functions except the injection of the 1 V signal (the Modulator) on to the neutral are included in a prototype microprocessor controlled instrument. This device measures the power in each of the 3 phases (rated 230 v 10 A per phase), adds the three outputs, compares with a set point, and outputs a square wave with the correct characteristics for modulating on to the neutral wire. This particular Laboratory scale system is not suitable for scaling up to a larger 250 kW system.

2. Dongles

Quantity: one per Appliance

As described earlier in this document, Dongles are devices that sit in the power line between the switchboard on the house and the appliances in the house. Ideally they would be built into the appliance (i.e. the load). The Dongle makes the appliance LDC compliant so that it can operate in the manner required. There are in principle four types of dongles:

Type A: Simple on/off type. The Dongle isolates the control signal on the neutral wire and switches on at a fixed frequency and off at a lower frequency. For example the Dongle may switch on at 720 Hz and off at 660 Hz. Below 660 Hz the Dongle is always off, above 720 Hz it is always on, and between these two frequencies it is bistable and its state depends on the past history in the extant application.

Type B: On/off with minimum switching periods. This type of Dongle is suitable for motorized devices like a fridge or freezer where the number and/or frequency of switching events must be controlled. Here the device acts like a Type A Dongle but when it is switched on it must stay on for some minimum period—eg 10 minutes, and when it is switched off it must stay off for a minimum period—eg 20 minutes.

Type C: This Dongle is fully proportionally controlled. If the control frequency is 600 Hz or below the Dongle is off, if it is 1,000 Hz or above the Dongle is on, and between these two extremes the maximum output allowed varies linearly proportional to the frequency. The Appliance must be rated for this type of application. A good application is heat pumps or EV battery chargers.

Type D: This Dongle is similar to Type C but it is not continuously variable but has say eight separate states. The control frequency 600-1,000 Hz is divided into eight regions and these correspond to the operating states. In the lowest region the device is on at $\frac{1}{8}^{th}$ of full power, in the next region it is on at $\frac{2}{8}^{ths}$ of full power, and so on. To achieve this requires a compliant resistive load switching integral cycles in a random sequence to give the correct power output.

3. Dongle Applications

There are two alternatives to the way that Dongles may be used in a House. For example.

3.1 Alternative 1: Non-Intelligent Dongles

With this alternative every appliance has its own Dongle which decodes all its own information. As outlined above the availability of power is encoded on to the neutral wire by a 1-2 V signal that varies from 600 Hz (no power available for priority loads) to 1,000 Hz (ample power available) on top of the mains voltage. The Dongles filter out this signal and use it to switch devices on and off, or vary them continuously by switching on mains zero crossings, according to the type of Dongle used—Type A to D. Here all the appliances/controllable loads are in a strict priority sequence or order and are switched on and off when activated by the control signal. For example essential loads are active at all times (if not switched off) and do not have a Dongle, high priority loads might be set to be active for a control signal in the range 600-660 Hz, and low priority loads might be active if the signal frequency is above perhaps 900-1000 Hz. These trip points will vary with each Dongle but will be set at the time of installation. The trip points will have some hysteresis—for example a Dongle may switch on at 720 Hz and switch off at 660 Hz and both of these points are set at the time of installation. Dongles type C and D are also active all the time taking power proportionally to the control frequency.

Power: Self powered

Signals: 1-2 V 600-1000 Hz,

Software programming: small

Measurement capability: none

Programmability: very limited 3.2 Alternative 2: Intelligent Dongles

This alternative has electronic circuitry—a house controller (HC)—that is preferably, but not necessarily, located in the meter box. It has the capability to decode the modulated signal on the neutral wire and know what devices are on/off and it can communicate with all the Dongles. It can also measure the power flow into the house (essentially Amps) but the flow of power to the Dongles and the appliances is unchanged. Communications to the appliances by the HC are for example by WLAN at 2.4 GHz or other, and, as before each appliance has its own Dongle but now each Dongle has its own WLAN transceiver. The HC is able to reprogram the Dongles on-line so that the priority order of every appliance is continually changing and only the default setting is set at the time of installation. Each appliance will be able to report on/off information and load current back to the house Driver. The Dongles will be able to operate as all four Types as above—in on/off modes with or without delays, or in proportional control modes as instructed by the HC. The type selection can be done in real time. As before small devices will be controlled using on/off switching on zero crossings to reduce RFI, while larger ones—hot water heater, heat pump, electric clothes drier, and electric vehicle charger will operate in a continuously variable way to give continuously variable control as described above for Type C and D Dongles. The Dongles will continually update themselves in response to the extant circumstances so that the power available is always used in an optimal fashion—for example if a high priority device is physically switched off the power slot that it was taking—say 660-720 Hz will be dynamically re-allocated i.e. the priority for that load has effectively been reassigned.

The intelligent dongles can act interactively with the appliances and the HC over the WLAN network. For example they may sense a characteristic such as a power requirement of the load being supplied, so with an EV battery charging load the HC can be aware of the state of charge and act so that the battery is fully charged by some specific time. Similarly if a drier is being used the 'dryness' of the clothes may be managed so that they are dry when required. Options like this will incur a higher price for the electricity but add to the versatility of the total system.

Power: self powered from 230 V 50 Hz

Signal: WLAN 2.4 GHz bi-directional, 1-2 V 600-1,000 Hz on the neutral wire.

Software programming: significant to achieve full potential.

Measurement capability: comprehensive

Fault reporting: comprehensive.

The invention may be implemented to allow a large number of households to be incorporated into an islanded system and be able to prioritise loads without any impediment to individual households setting their own priorities. A straightforward controller is used to determine when those loads can be switched on and when they must be switched off. There are clear advantages in having the largest loads—EV and hot water—with continuously variable outputs so that they are essentially available at all times to fill in the gaps between the switching on and off of other loads. Thus, the invention allows EV's to be charged as a LDC compliant load and this extends to the operation of those EV's in an electrified roadway situation. In a wind-powered system a community can get great benefit by having a wind turbine with a very large penetration. Excess power can still be exported to the grid but the total load on the grid can be managed within narrow limits in most circumstances. This same load management also extends to interest groups with isolated transformers in a city.

In another embodiment of the invention the system controller does not continuously transmit a signal, but instead the load controllers poll the system controller (or the measuring means directly) for updated information. In this case the information received by one load controller may differ from that received by another, for example if there has been a change to the power draw on the grid between one load controller requesting information and the next one doing so, or if the system controller adds a unique identifier to the data sent to a particular load controller. Such systems may be less desirable than those described above due to the potential to introduce additional latency into the system.

In some embodiments the islanded system may have more than one point of coupling to the grid, each point of coupling associated with a means for measuring the power drawn from the grid through the coupling. The control of the load controllers in the islanded system may be based on an aggregate or average of the power measurement readings. In a variant of this embodiment, the different points of coupling may be associated with separate islanded systems whose occupants have agreed to co-operate such that their combined power usage is compared to a set point.

Unless the context clearly requires otherwise, throughout the specification, the words "comprise", "comprising", and the like, are to be construed in an inclusive sense as opposed to an exclusive or exhaustive sense, that is to say, in the sense of "including, but not limited to".

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A power supply system comprising:
   a coupler configured to connect the power supply system to a supply grid and supplying a plurality of remote electric loads over a supply network, each of said plurality of remote electric loads being associated with a load controller of a plurality of load controllers to control the power demanded by that load;
   a measuring device configured to measure a total power transferred between the supply grid and loads through the coupler;
   a system controller to signal some of the loads to adjust their power demand in response to determining that the measured power transfer exceeds a set point in order to limit a peak power transferred through the coupler, and provide a control signal to the plurality of load controllers, wherein each of the plurality of load controllers receives the same control signal and determines a maximum power which the load or each load associated with the load controller is allowed to draw from a power system based on information contained in the control signal; and
   a system element configured to vary the set point.

2. The power supply system as claimed in claim 1 wherein the control signal provided by the system controller is available on the supply network.

3. The power supply system as claimed in claim 2 having a characteristic which varies in proportion to the difference between the measured power transferred and the set point.

4. The power supply system as claimed in claim 3 wherein the characteristic is frequency.

5. The power supply system as claimed in claim 4 wherein the control signal is continuous.

6. The power supply system as claimed in claim 1 wherein the power supply system adjusts the set point in response to a grid control signal.

7. A power supply management system for controlling a group of loads supplied over a supply network from a transformer connected to a supply grid, the system having:
   a system controller to signal some of the loads to change loading in response to a condition, and provide a control signal to a plurality of load controllers, wherein each of the plurality of load controllers receives the same control signal and determines a maximum power which the load or each load associated with the load controller is allowed to draw from a power system based on information contained in the control signal; and
   a coupler configured to couple the signal between the neutral connection of the transformer secondary and earth;
   a system element configured to vary a set point.

8. The power supply management system as claimed in claim 7 wherein the control signal provided by the system controller is available on the supply network.

9. The power supply management system as claimed in claim 8 wherein the loads change loading dependent on frequency of the control signal.

10. The power supply management system as claimed in claim 9 wherein the control signal is continuous.

11. A power supply management system for controlling a group of consumer loads coupled to a supply grid, and comprising:
    a load distributor to distribute power from the grid to the loads;
    a signal receiver to receive a grid load shedding signal;
    a priorities receiver to receive consumer shedding priorities for each of the loads;
    a load controller to reduce power to some of the loads in response to receiving a grid load shedding signal and in accordance with the consumer shedding priorities;
    a system controller to provide a control signal to a plurality of said load controllers, wherein each load controller receives the same control signal and determines a maximum power which the load or each load associated with the load controller is allowed to draw from a power system based on information contained in the control signal; and
    vary a set point.

12. The power supply management system as claimed in claim 11 wherein the consumer shedding priorities can be varied.

13. The power supply management system as claimed in claim 11 wherein the grid load shedding signal is provided on the supply grid.

14. The power supply management system as claimed in claim 13 wherein the grid load shedding signal is coupled to the supply grid between a neutral connection and earth.

15. The power supply management system as claimed in claim 11 wherein the group of consumer loads includes an intermittent source of generation.

16. The power supply management system as claimed in claim 15 wherein the consumer shedding priorities allow power from the intermittent source of generation to be preferentially supplied to energy loads.

17. A power supply management system for supplying a plurality of electric loads coupled to a supply grid, the system having:
   a measuring device configured to measure a total power transferred from the grid to the loads; and
   a system controller to provide a control signal to a plurality of said load controllers, wherein each load controller receives the same control signal and determines a maximum power which the load or each load associated with the load controller is allowed to draw from a power system based on information contained in the control signal;
   wherein the system controller is further arranged to adjust the power transfer set point in response to a grid control signal.

18. The power supply management system as claimed in claim 17 wherein the system controller provides a control signal available on the supply grid.

19. The power supply management system as claimed in claim 18 having a characteristic which varies in proportion to the difference between the measured power transferred and the set point.

20. The power supply management system as claimed in claim 19 wherein the characteristic is frequency.

* * * * *